United States Patent [19]

[11] 4,095,262

St. Clair

[45] June 13, 1978

[54] LIGHTNING PROTECTION CIRCUIT

[76] Inventor: Homer F. St. Clair, Levanna Rd., Aurora, N.Y. 13026

[21] Appl. No.: 754,355

[22] Filed: Dec. 27, 1976

[51] Int. Cl.² .................... H02H 1/04

[52] U.S. Cl. .................... 361/1; 361/131

[58] Field of Search .................... 361/131, 132, 1, 110, 361/117–120, 56, 91; 325/362, 150; 179/184

[56] References Cited

U.S. PATENT DOCUMENTS 2,957,110 10/1960 Boylan .................... 361/119

*Primary Examiner*—Patrick R. Salce

*Attorney, Agent, or Firm*—Charles S. McGuire

[57] ABSTRACT

A circuit arrangement for protecting electrical appliances such as radio and television sets from damage due to lightning during electrical storms, and the like. The antenna input and power supply lines are connected in a common circuit with one another and may further be connected to the chassis ground in response to movement of the usual on-off switch to the "off" position, thus eliminating any potential differences. This common circuit is isolated by a gap from all outside electrical sources when the set is turned off. Also, the antenna lead-in wires may be electrically connected to an outside, ground-driven rod when the set is turned off.

7 Claims, 10 Drawing Figures

LIGHTNING PROTECTION CIRCUIT

BACKGROUND OF THE INVENTION

The present invention relates to electrical circuits designed to protect appliances from the effects of lightning. More specifically, the invention relates to a circuit which serves to isolate the components of a television set, or the like, from the electrical path of lightning through operation of the set's on-off switch.

It is a well-known fact that certain electrical household appliances are subject to damage from the effects of the extremely high voltage loads which are present when lightning from an electrical storm passes through the appliance. For example, radio receivers and television sets which are commonly plugged into the household electrical supply, and may also be connected to outside antennae are particularly susceptible to damage by lightning of components which may be quite expensive to replace. In conventional sets, one side of the AC power line remains connected through components of the set to the chassis when the set is turned off, providing a path for lightning from the AC line to the antenna ground. Although the appliance may be protected by disconnecting the electrical supply and antenna connections, this is often impractical or inconvenient.

A principal object of the present invention is to provide circuit means for incorporation in or with a standard television set, or similar electrical appliance, which will substantially insure against lightning damage when the set is turned off.

Another object is to provide a simple and economical circuit attachment for standard FM or AM radio receivers, television sets, etc., which protects the components from damage by lightning without the necessity of unplugging the set and disconnecting the antenna during electrical storms.

Other objects will in part be obvious and will in part appear hereinafter.

SUMMARY OF THE INVENTION

In accordance with the foregoing objects, the invention contemplates a circuit arrangement wherein movement of the on-off switch to the "off" position serves to isolate the circuit components subject to damage from hight voltage loads due to lightning which may pass through the household electrical system. The antenna and power input circuits of the set are connected in a common circuit to eliminate differences in potential. This common circuit, which may include a chassis ground connection, is isolated by a gap to prevent entry of lightning through operation of the on-off switch in the usual manner.

Switching arrangements are disclosed which may be made up from a plurality of conventional slide switches, ganged to operate in unison from a single control member or solenoid. In one embodiment the circuit arrangement also serves to connect the antenna lead-in wires to an outside ground, while disconnecting such wires from the antenna input circuit(s). This connection is eliminated in a second embodiment for use in applications where a conventional lightning arrestor is provided on the antenna lead-in, thereby rendering the outside ground connection unnecessary.

DETAILED DESCRIPTION

Figure 1:
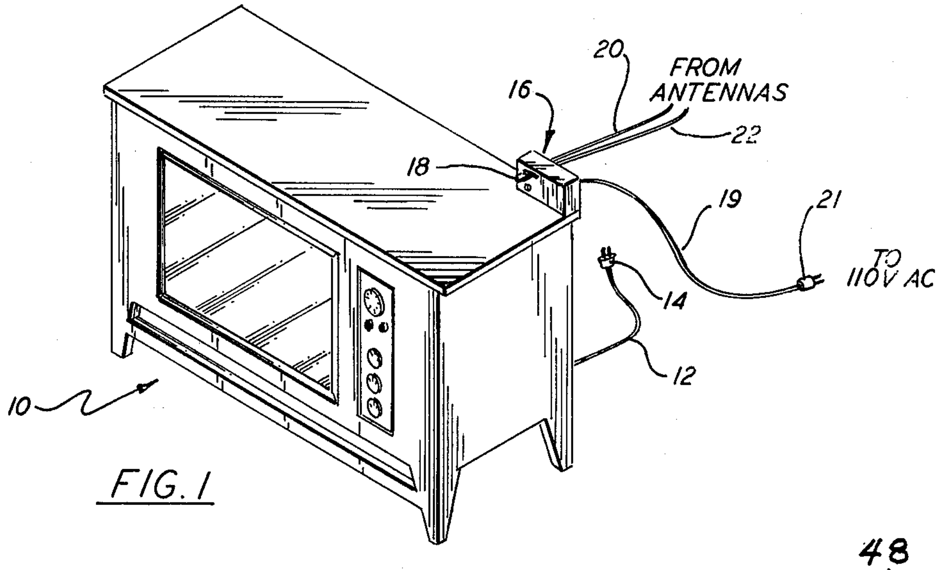
FIG. 1 is a perspective view of a standard television set showing the device of the present invention in the form of an attachment mounted thereon.

Referring now to the drawings, in FIG. 1 is shown a television set, generally denoted by reference numeral 10, which is conventional in all respects. Although the circuit arrangement of the invention may be advantageously employed with any electrical appliance having components which are subject to damage by high voltage spikes, as commonly encountered during electrical storms, it will be described in connection with a television set for illustrative purposes. Set 10 includes the usual power lead-in line 12 having plug 14 for connection to a socket providing standard household current.

As will be apparent, the circuit arrangement of the invention may, if desired, be incorporated into the wiring of the appliances at the time of manufacture. However, it may also be conveniently packaged as an attachment for existing appliances and connected thereto by appropriate wiring in a simple and expedient manner. The two disclosed embodiments of the invention are both described in the context of separate attachments, rather than built-in components.

The attachment of the invention, denoted in FIG. 1 by reference numeral 16, is shown mounted upon the upper side of set 10, although it may, of course, be placed in any convenient position. The manually engageable end of switch control member 18 extends forwardly for easy access. As explained later in more detail, member 18 controls the turning on and off of set 10, as well as operating the lightning protection circuit. Thus, power lead-in wire 12, is plugged into a socket in attachment 16 and an additional power lead-in wire 19 extends from the attachment for connection to the household power supply by plug 21, as described later in more detail. VHF and UHF antenna lead-in wires 20 and 22 are also connected through the circuit arrangement of attachment 16, as also described later herein, to the antenna input circuits of set 10.

Figure 2:
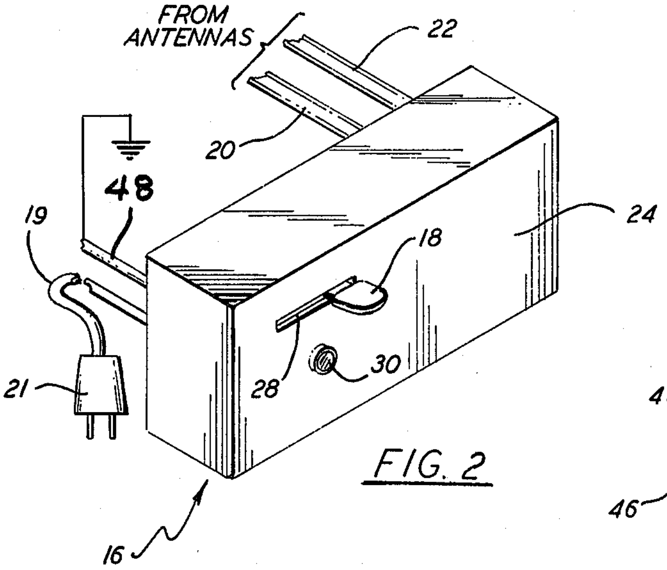
FIGS. 2 and 3 are perspective views of a first embodiment of the attachment showing the front and rear sides thereof, respectively.
Figure 3:
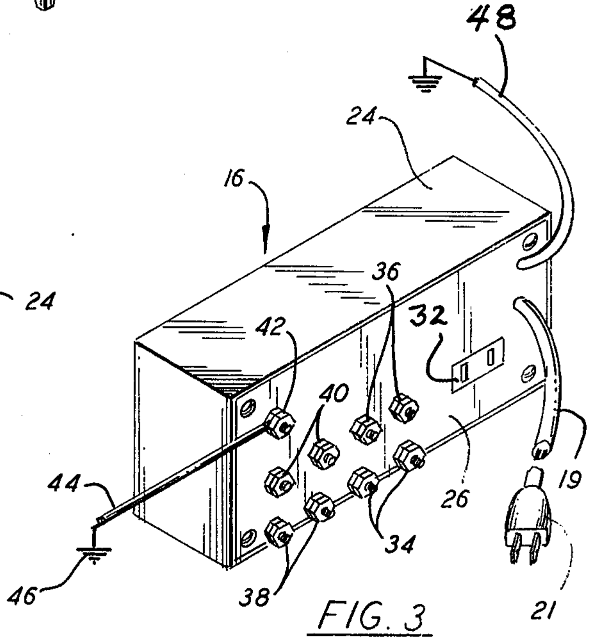

Referring now to FIGS. 2 and 3, the circuit arrangement of the invention is contained in a case provided by five-sided cover 24 and back plate 26. Switch control member 18 extends through slot 28 in the front side of cover 24 for manual engagement to effect movement between first and second positions of the associated switches. Small bulb 30 may be provided, if desired, to provide an indication that the switches are in the "on" position of the set when the bulb is illuminated.

Receptacle 32 on the rear side of attachment 16 provides means for connection of power input line 12 of set 10. Lead-in wires 20 from a VHF antenna (not shown) are connected to terminals 34, and leads from the VHF antenna input circuit of set 10 are connected to terminals 36. Likewise, UHF antenna lead-in wires 22 are connected to terminals 38 and leads from the UHF antenna input circuit to terminals 40. Terminal 42 provides a connection for an additional line 44, connected at its other end to outside ground connection 46, such as a ground-driven rod. Line 48 extends from a connection at one end within attachment 16 for electrical connection at the other end to the chassis ground of set 10.

Figure 4:
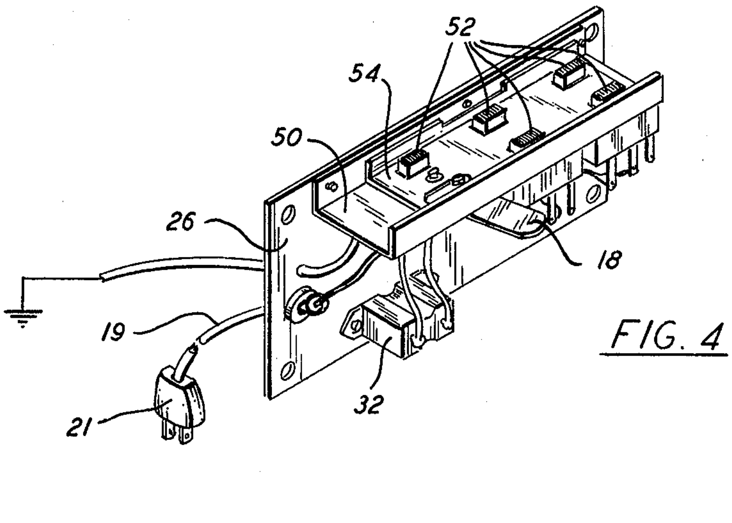
FIG. 4 is a perspective view showing the internal structure of the first embodiment.
Figure 5:
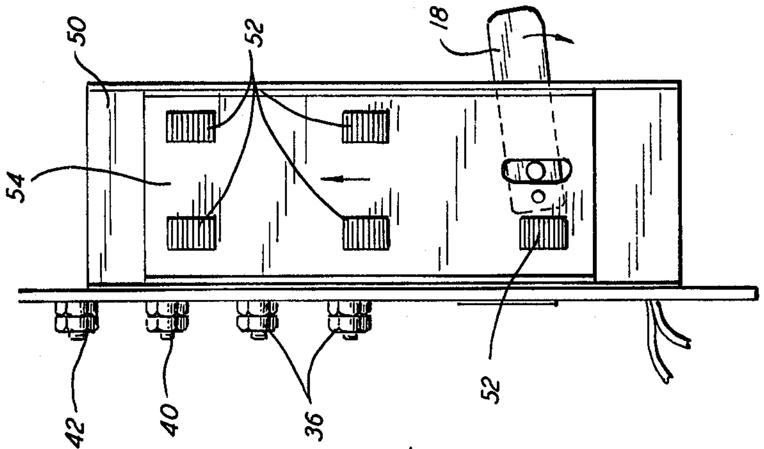
FIG. 5 is a top plan view of the attachment of FIGS. 2–4, with the cover removed.

Referring to FIGS. 4 and 5, an example of the internal structure of attachment 16 is shown, made up of a plurality of common, inexpensive, slide type switches. The switches are attached to support bracket 50, which is affixed to back plate 26. In this embodiment, the circuit arrangement includes three double pole-double throw and two double pole-single throw switches. Operating slide buttons 52 of the five switches extend through openings in support bracket 50 and in slide member 54. Switch control member 18 is pivotally attached to bracket 50 and is connected to slide member 54 to effect movement thereof, in response to pivotal movement of the control member, between left and right terminal positions. Movement of slide member 54 serves to move all of slide buttons 52 in unison between the two positions of the associated switches. While a single switch having the requisite terminals and contacts could, of course, be designed and fabricated to perform the functions of the individual switches associated with buttons 52, the illustrated embodiment, as earlier stated, provides a simple and expedient use of inexpensive switches which are readily available. Also, rather than mechanical slide-type switches, any desired switch construction may be used, for direct manual actuation and/or remote operation.

Figure 6:
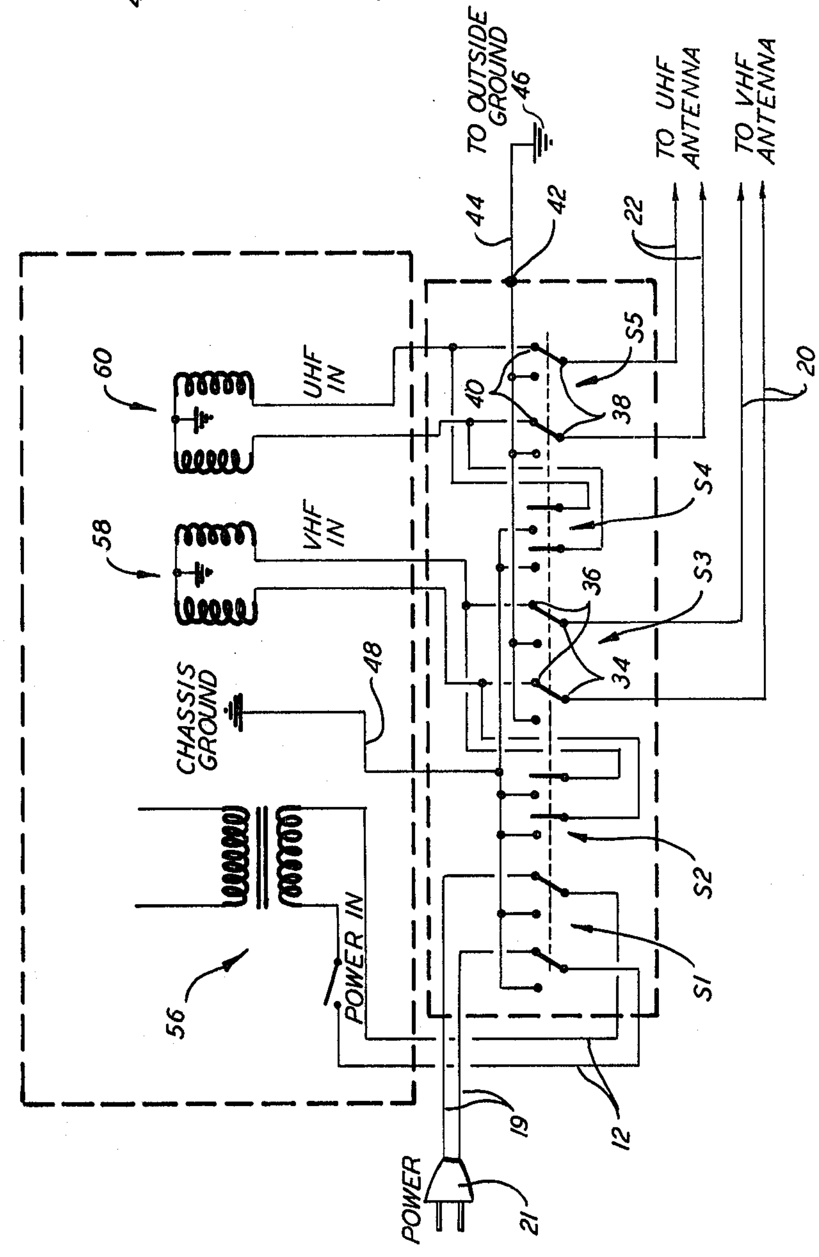
FIG. 6 is an electrical schematic diagram of the first embodiment of the circuit arrangement and portions of the television set.
Figure 7:
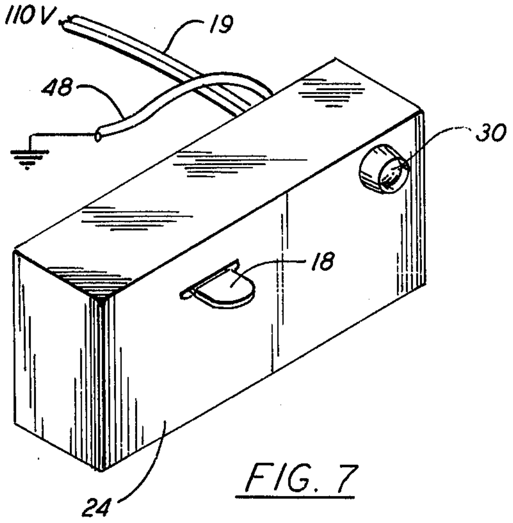
FIGS. 7 and 8 are front and rear perspective views of a second embodiment of the attachment.
Figure 8:
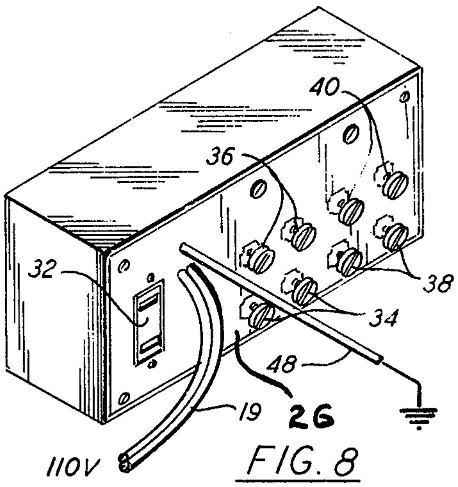
Figure 9:
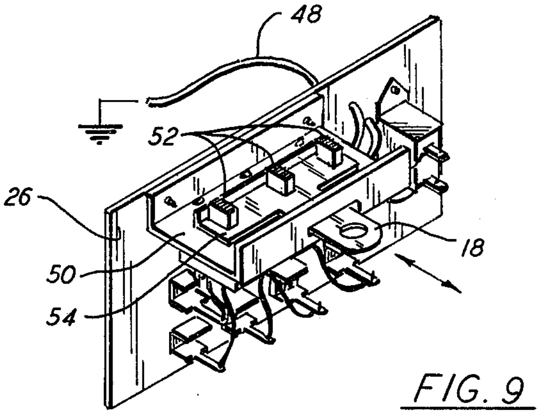
FIG. 9 is a rear perspective view of the second embodiment with the cover removed.
Figure 10:
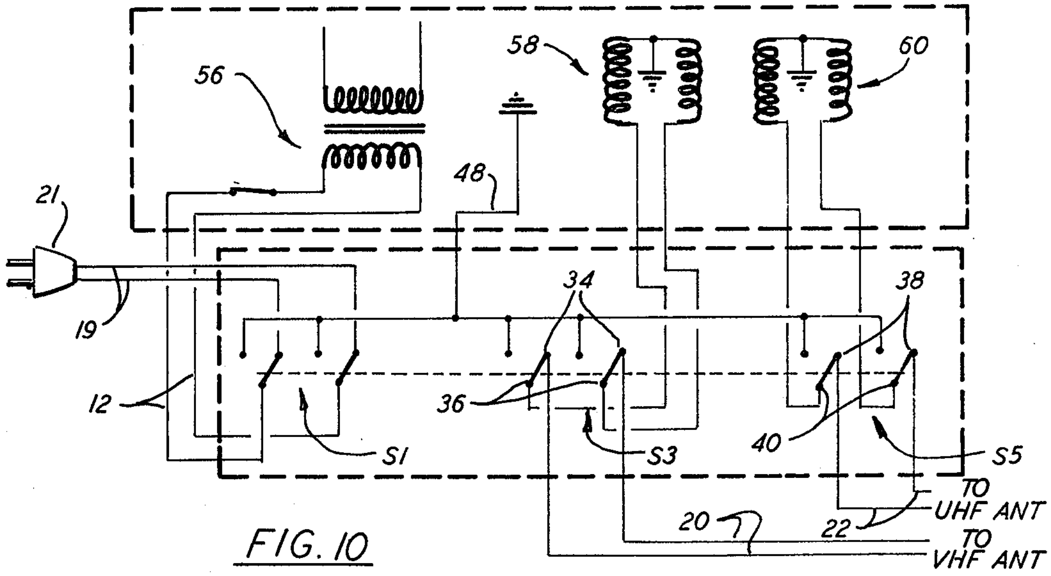
FIG. 10 is an electrical schematic of the circuit arrangement of the second embodiment.

FIG. 6 illustrates schematically the circuit arrangement and connections, shown in the position of the switches with set 10 turned on to receive power through lead-in wire 19, the contacts of the switch indicated as S1, and wire 12 to the power supply circuit of set 10, generally designated in the form of transformer 56. It will be understood, of course, that the power supply circuits of some sets may not require direct connection to a transformer, this example being used for illustrative purposes only. Switch S2 is of the double pole-single throw type, the contacts being in the open position, as shown, when the set is turned on. The contacts of switch S3 are numbered in FIG. 6 the same as the terminals on the outside of attachment 16 to which they are connected. Thus, VHF antenna lead-in wire 20 is connected to terminals 34 and, through switch S3, to terminals 36 and the VHF antenna input circuit of set 10, generally denoted by reference numeral 58. The contacts of switch S4 are in the open position, and switch S5 connects UHF antenna lead-in wire 22, through terminals 38 and 40, to UHF antenna input circuit 60. Line 48 connects the "off" position contacts of switches S1, S2 and S4 to the chassis ground of set 10, and line 44 connects the "off" position contacts of switches S3 and S5 with outside ground 46, through terminal 42.

Thus, when switch control member 18 is moved to place switches S1–S5 in their first (illustrated) position, set 10 is turned on with its power supply circuit 56 connected through switch S1 to power lead-in wire 19, and antenna input circuits 58 and 60 are connected through switches S3 and S5 to their respective antenna lead-in wires. When the switch control member is moved to place switches S1–S5 in their second position set 10 is turned off; power supply circuit 56 is disconnected from both sides of power lead-in wire 19 and connected to chassis ground wire 48; antenna input circuits 58 and 60 are disconnected from antenna lead-in wires 20 and 22, and connected through switches S2 and S4 to chassis ground wire 48; antenna lead-in wires 20 and 22 are connected through switches S3 and S5 to outside ground 46.

Turning now to the embodiment of FIGS. 7–10, reference numerals common with the first embodiment are used to denote similar elements. Again, the invention is illustrated in the form of a separate attachment wherein the switch elements are contained within the housing formed by cover 24 and back plate 26. Bulb 30 and switch control member 18 are provided as before, with the control member in this case being of the push-pull type for operating the associated switches. Terminals 34 and 38 provide connections for the VHF and UHF antenna lead-in wires, and terminals 36 and 40 for the antenna input circuits of the associated set. The power cord of the set is plugged into receptacle 32 and power lead-in wire 19 is connected to a household power outlet, as before.

The major difference between the two embodiments is the elimination, in the second embodiment, of the outside ground connection for the antenna lead-in wires. In many applications such a connection would be considered unnecessary, as where conventional lightning arrestor means are provided on the antenna lead-in. Elimination of the outside ground obviates the need for switching means connecting the antenna input circuits and outside ground in response to movement of the power switch to the "off" position. Thus, the switches indicated in FIG. 6 as S2 and S4 are omitted in this embodiment, as is evident from the schematic illustration of FIG. 10. Only three switch means are required, all of the double pole-double throw type, corresponding to those designated S1, s3 and S5 in the FIG. 6 schematic and therefore similarly designated in FIG. 10.

It should be noted that while both of the described and illustrated embodiments provide connections for VHF and UHF antennae, the invention is equally practical for use with radio or television sets having only one antenna. In such applications, the terminals and switch means associated with one of the antennae are eliminated, with connections and operation remaining the same in all other respects. It is further pointed out that the connection of the common circuit formed by the power supply and antenna input circuits when the set is turned off need not necessarily be connected to the chassis ground in all applications of the invention. In some cases it may be inconvenient to make such a connection, as in sets having so-called floating grounds, where chassis ground connections may be on a plurality of circuit boards, and the like. Since the circuit arrangement of the present invention serves to disconnect both sides of the AC power and the antennae lead-ins from the power supply and antennae input circuits of the set, and to connect the power supply and antennae inputs in a common circuit when the set is turned off, the chassis ground connection may be considered unnecessary. At any rate, it is apparent that the circuit arrangement disclosed herein will provide effective protection from the potentially damaging effects of lightning simply by turning off the set with which it is associated.

What is claimed is:

1. A circuit arrangement for protecting an electrical appliance having a chassis ground, an antenna input circuit and a power supply circuit from the effects of lightning, said circuit arrangement comprising, in combination:

(a) a power lead-in wire connected at one end to first terminal means on the appliance and at the other end to a source of electrical power;

(b) first switch means interposed between said power lead-in wire and the power supply circuit of the appliance and movable between first and second positions, connecting and disconnecting, respectively, said power lead-in wire and the power supply circuit;

(c) at least one antenna lead-in wire connected at one end to second terminal means on the appliance and at the other end to an antenna;

(d) second switch means interposed between said one antenna lead-in wire and the antenna input circuit of the appliance and movable between first and second positions, connecting and disconnecting, respectively, said antenna lead-in wire and the antenna input circuit;

(e) a single line electrically connecting the power supply circuit and antenna input circuit of the appliance in a common circuit and leaving said first and second terminal means open in response to movement of said first and second switch means to said second positions thereof; and (f) switch control means operable to move said first and second switch means simultaneously between said first and second positions of each.

2. The invention according to claim 1 and further including means electrically connecting said common circuit with the chassis ground in response to movement of said first and second switch means to said second positions thereof.

3. The invention according to claim 1 wherein the appliance includes two separate antenna input circuits, said circuit arrangement further including a second antenna lead-in wire and third switch means interposed between said second antenna lead-in wire and an antenna input circuit separate from the antenna input circuit with which said second switch means is connected, said third switch means being movable simultaneously with said first and second switch means by said switch control means between a first position, wherein said second antenna lead-in wire is connected with said separate antenna input circuit, and a second position, wherein said separate antenna input circuit is connected with said common circuit.

4. The invention according to claim 3 wherein said first, second and third switch means comprise three double pole, double throw switches.

5. The invention according to claim 1 and further including housing means wherein said first and second switch means are enclosed and having terminals for connection thereto of said power lead-in wire, said antenna lead-in wire, and the power input circuit and antenna input circuit of the appliance.

6. The invention according to claim 5 wherein said housing means is secured to an exterior portion of the appliance.

7. The invention according to claim 5 wherein said switch control means comprises a member extending through an opening in said housing means, having an exterior portion connected to said first and second switch means for movement thereof between said first and second positions.

* * * * *